(No Model.)
A. J. HUNT.
HAND LEVER FRUIT PRESS.
No. 260,571.  Patented July 4, 1882.
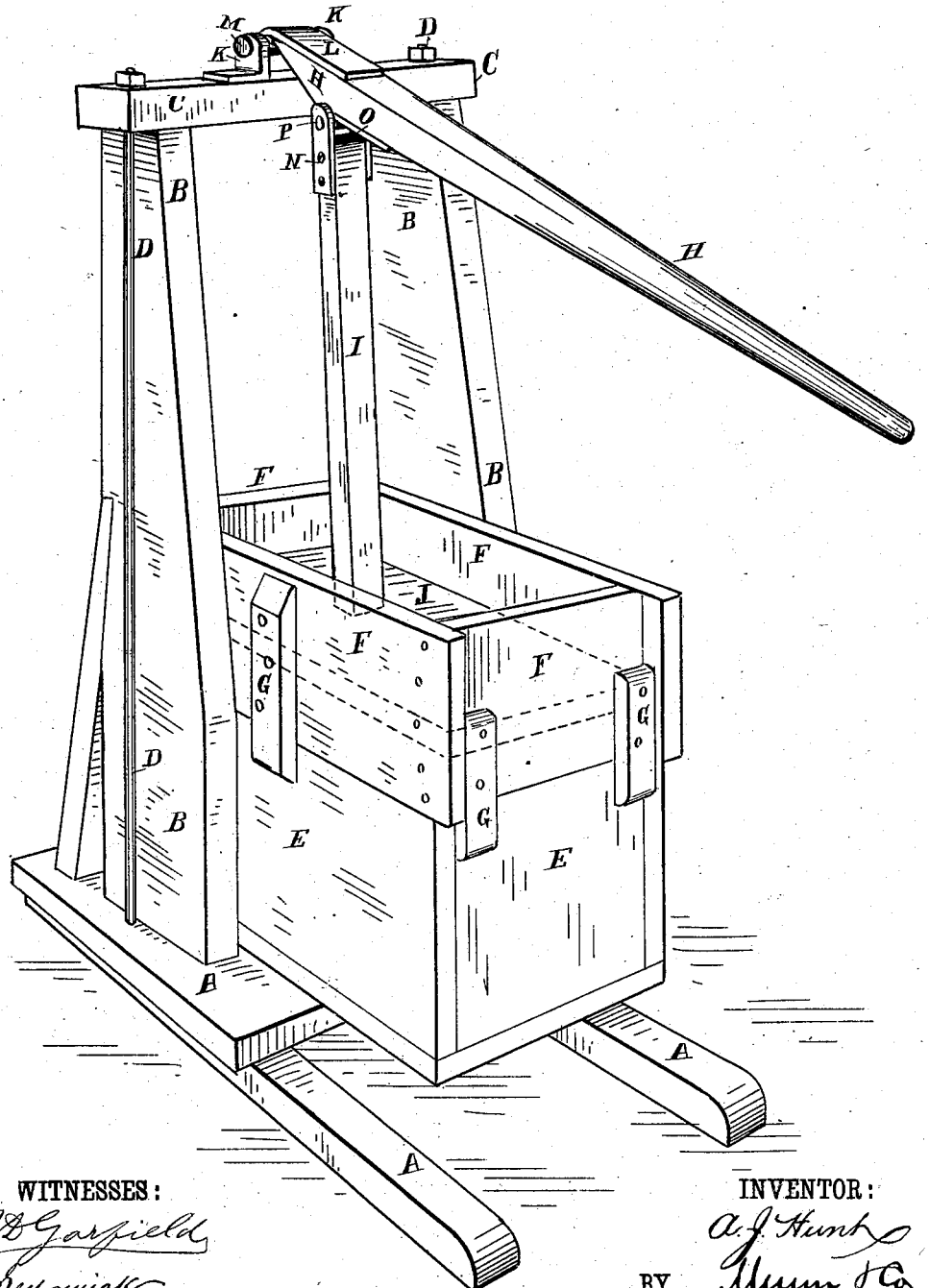
WITNESSES:
INVENTOR:
BY
ATTORNEYS.

The lower side of the inner end of the lever H is beveled, as shown in the drawing, so that the said lever can be swung down close to the forward side of the cross-bar C.

UNITED STATES PATENT OFFICE.

ANDREW J. HUNT, OF ALBANY, OREGON.

HAND-LEVER FRUIT-PRESS.

SPECIFICATION forming part of Letters Patent No. 260,571, dated July 4, 1882.

Application filed April 24, 1882. (No model.)

*To all whom it may concern:*

Be it known that I, ANDREW J. HUNT, of Albany, in the county of Linn and State of Oregon, have invented a new and useful Improvement in Hand-Lever Fruit-Presses, of which the following is a full, clear, and exact description.

Reference is to be had to the accompanying drawing, which is a perspective view of my improvement.

The object of this invention is to facilitate the pressing of dried fruit and other substances into small packages.

The invention consists of a novel combination of a frame, hand-lever, and follower, by which dried fruit or other substances may be conveniently compressed into boxes and held under pressure within the box as long as desired.

A represents the base or platform of a press, which is made of such a size as to give a stable support to the press and readily receive the box or other package into which the fruit is to be pressed.

To the side parts of the platform A are attached the lower ends of two standards, B, the upper ends of which are connected by a cross-bar, C, forming a vertical frame. The press-frame is strengthened against the strain by the tie-rods D, which pass through the platform A and the ends of the cross-bar C and have nuts screwed upon their ends.

E represents the box or package into which the dried fruit or other substance is to be pressed, and which is placed upon the platform A.

Upon the upper edge of the box or package E is fitted an extension-frame, F, which is kept in place upon box E by cleats G, attached to the sides and ends of the frame F in such positions that their lower ends will overlap the sides and ends of the said box E, so as to keep the said frame F securely in place. The frame F is so formed that its interior surface will be flush with the inner surface of the box E.

To the top of the cross-bar C of the vertical frame are attached lugs K, to which is hinged by an eye-strap, L, and pin or bolt M the inner end of a lever, H, to the lower side of which is hinged by lugs N, an eye-strap, O, and a pin or bolt, P, the end of a bar, I, to serve as a stem or pressure-bar to the follower J.

The follower J is made of such a shape and size as to fit into and move freely in the interior of the frame F and box E.

The lower side of the inner end of the lever H is beveled, as shown in the drawing, so that the said lever can be swung down close to the forward side of the cross-bar C.

In using the press the desired amount of dried fruit or other substance is placed in the said box E and frame F, which are then arranged upon the platform A, and the follower J is placed upon the fruit in the frame F. The lower end of the bar or stem I is then arranged upon the follower J, and the free end of the lever H is drawn downward, compressing the fruit into the box E. By hinging the upper end of the stem I near the hinged end of the lever H the latter and stem I will toggle with or come into such a position in connection with each other and the cross-bar C of the vertical frame that the said lever will be locked in place, so that the lever H cannot be raised by the upward pressure of the dried fruit. The press is then left with the fruit under pressure until another box E has been filled, or longer, if desired, by which time the compressed fruit will be set, so that the said fruit will not expand when the pressure is removed. The lever H is then swung upward over the cross-bar C, which withdraws the stem I from the follower J and takes the lever and pressure-bar out of the way. The box E is then removed, the frame F and follower J are taken off, and a cover is nailed upon the box E, which completes the package.

Having thus described my invention, I claim as new and desire to secure by Letters Patent—

1. A hand-lever fruit-press, constructed substantially as herein shown and described and consisting of the frame A B C D, the box E, the hinged lever H, the hinged pressure-bar I, and the follower J, as set forth.

2. In a hand-lever fruit-press, the combination, with the frame A B C D, hinged lever H, and the hinged pressure-bar I, of the box E and frame F, as set forth.

3. In a hand-lever fruit-press, the combination, with the top bar, C, and the lever H, having beveled inner end, of the hinge K L M, substantially as herein shown and described, whereby the said lever can be swung down close to the side of the said top bar, as set forth.

ANDREW J. HUNT.

Witnesses:
F. WILLERT,
JOHN W. ALTHOUSE.